United States Patent
Kolor et al.

(10) Patent No.: US 12,112,113 B2
(45) Date of Patent: Oct. 8, 2024

(54) COMPLEMENTARY DIE-TO-DIE INTERFACE

(71) Applicant: Apple Inc., Cupertino, CA (US)

(72) Inventors: Sergio Kolor, Haifa (IL); Dany Davidov, Tirat Carmel (IL); Nir Leshem, Beit Yanai (IL); Mark Pilip, Kiryat Bialik (IL); Lior Zimet, Kerem Maharal (IL)

(73) Assignee: Apple Inc., Cupertino, CA (US)

( * ) Notice: Subject to any disclaimer, the term of this patent is extended or adjusted under 35 U.S.C. 154(b) by 778 days.

(21) Appl. No.: 17/194,003

(22) Filed: Mar. 5, 2021

(65) Prior Publication Data
US 2022/0284163 A1    Sep. 8, 2022

(51) Int. Cl.
*G06F 30/392* (2020.01)
*G06F 13/40* (2006.01)
*G06F 115/02* (2020.01)

(52) U.S. Cl.
CPC ........ *G06F 30/392* (2020.01); *G06F 13/4068* (2013.01); *G06F 2115/02* (2020.01)

(58) Field of Classification Search
None
See application file for complete search history.

(56) References Cited

U.S. PATENT DOCUMENTS

| | | | |
|---|---|---|---|
| 7,098,541 B2 | 8/2006 | Adelmann | |
| 7,340,548 B2 | 3/2008 | Love | |
| 8,190,855 B1 | 5/2012 | Ramey et al. | |
| 8,374,175 B2 | 2/2013 | Riley | |
| 8,670,261 B2 | 3/2014 | Crisp et al. | |
| 8,786,069 B1 | 7/2014 | Haba et al. | |
| 9,029,234 B2 | 5/2015 | Safran et al. | |
| 9,244,874 B2 | 1/2016 | Hearn et al. | |
| 9,465,405 B1 * | 10/2016 | Miller | G06F 13/4217 |
| 9,842,076 B2 * | 12/2017 | Ghosh | G06F 13/4027 |
| 10,153,006 B2 | 12/2018 | Hamada | |
| 10,491,462 B1 | 11/2019 | Wagner et al. | |
| 10,523,585 B2 | 12/2019 | Davis et al. | |

(Continued)

FOREIGN PATENT DOCUMENTS

| | | |
|---|---|---|
| WO | 2014185917 A1 | 11/2014 |
| WO | 2017112198 A1 | 6/2017 |

OTHER PUBLICATIONS

S. Ardalan et al., "Bunch of Wires: An Open Die-to-Die Interface," 2020 IEEE Symposium on High-Performance Interconnects (HOTI), pp. 9-16. (Year: 2020).*

(Continued)

*Primary Examiner* — Leigh M Garbowski
(74) *Attorney, Agent, or Firm* — Kowert, Hood, Munyon, Rankin & Goetzel, P.C.; Scott W. Pape; Dean M. Munyon

(57) ABSTRACT

A system includes a first instance and a second instance of an integrated circuit. The integrated circuits include respective external interfaces with a physical pin layout having transmit and receive pins for a particular bus located in complementary positions relative to an axis of symmetry. The external interfaces of the first and second instances of the integrated circuit are positioned such that the transmit and receive pins for the given I/O signal on the first instance are aligned, respectively, with the receive and transmit pins for the given I/O signal on the second instance.

20 Claims, 10 Drawing Sheets

(56) References Cited

U.S. PATENT DOCUMENTS

| | | | |
|---|---|---|---|
| 10,673,439 B1 | 6/2020 | Ahmad et al. | |
| 10,693,783 B2 | 6/2020 | Agarwal et al. | |
| 10,733,350 B1 | 8/2020 | Prasad et al. | |
| 11,016,810 B1 | 5/2021 | Parikh et al. | |
| 11,526,644 B2 * | 12/2022 | Narayanun | G06F 30/394 |
| 2004/0078709 A1 | 4/2004 | Beukema et al. | |
| 2005/0138260 A1 | 6/2005 | Love | |
| 2005/0195835 A1 | 9/2005 | Savage et al. | |
| 2009/0305463 A1 | 12/2009 | Bartley et al. | |
| 2014/0201500 A1 | 7/2014 | Niell et al. | |
| 2014/0301241 A1 | 10/2014 | Kumar et al. | |
| 2015/0036536 A1 | 2/2015 | Kumar et al. | |
| 2015/0331826 A1 | 11/2015 | Ghosh et al. | |
| 2015/0341224 A1 | 11/2015 | van Ruymbeke et al. | |
| 2016/0378701 A1 | 12/2016 | Niell et al. | |
| 2017/0220499 A1 | 8/2017 | Gray | |
| 2018/0218105 A1 | 8/2018 | de Lescure | |
| 2018/0285290 A1 | 10/2018 | Luan et al. | |
| 2019/0205493 A1 | 7/2019 | Garibay et al. | |
| 2019/0340314 A1 | 11/2019 | Boesch et al. | |
| 2019/0361770 A1 | 11/2019 | Geng et al. | |
| 2019/0378238 A1 | 12/2019 | Ramadoss et al. | |
| 2020/0074713 A1 | 3/2020 | Schuluessler et al. | |
| 2020/0151005 A1 | 5/2020 | Park et al. | |
| 2020/0153757 A1 | 5/2020 | Bharadwaj et al. | |
| 2021/0255947 A1 | 8/2021 | Koker et al. | |

OTHER PUBLICATIONS

U.S. Appl. No. 17/337,805, filed Jun. 3, 2021, 55 pages.
U.S. Appl. No. 17/868,495, filed Jul. 19, 2022, 57 pages.
International Search Report and Written Opinion in PCT Appl. No. PCT/US2023/011277 mailed May 12, 2023, 9 pages.
U.S. Appl. No. 17/337,805, filed Jun. 3, 2022.
Hansson et al., "An On-Chip Interconnect and Protocol Stack for Multiple Communication Paradigms and Programming Models", Harware/Software Codesign and System Synthesis Conference, Grenoble, France, Oct. 11-16, 2009, 10 pages.
Office Action in U.S. Appl. No. 17/337,805 mailed Sep. 6, 2022, 8 pages.

\* cited by examiner

700

Routing, by the first instance, a set of transmit pins to a first on-chip router using a non-default pin assignment to send first data via the set of transmit pins.
710

Routing, by the first instance, the set of receive pins to a second on-chip router using a default pin assignment to receive second data via the set of receive pins.
720

FIG. 7

COMPLEMENTARY DIE-TO-DIE INTERFACE

BACKGROUND

Technical Field

Embodiments described herein are related to systems-on-a-chip (SOCs) and, more particularly, to interfaces for coupling multiple SOCs.

Description of the Related Art

System-on-a-chip (SOC) integrated circuits (ICs) generally include one or more processors that serve as central processing units (CPUs) for a system, along with various other components such a memory controllers and peripheral components. Additional components, including one or more additional ICs, can be included with a particular SOC IC to form a given device. Increasing a number of processors and/or other discrete components included on an SOC IC may be desirable for increased performance. Additionally, cost savings can be achieved in a device by reducing the number of other components needed to form the device in addition to the SOC IC. The device may be more compact (smaller in size) if more of the overall system is incorporated into a single IC. Furthermore, reduced power consumption for the device as a whole may be achieved by incorporating more components into the SOC.

A given SOC may be used in a variety of applications, with varying performance, cost, and power considerations. For a cost-sensitive application, for example, performance may not be as desired as cost and power consumption. On the other hand, for a performance-oriented application, cost and power consumption may not be emphasized. Accordingly, a range of SOC designs may be utilized to support the variety of applications.

Increasing reuse of a given SOC design may be desirable to reduce costs associated with designing, verifying, manufacturing, and evaluating a new SOC design. Accordingly, a technique for scaling a single SOC design for a range of applications is desirable.

SUMMARY

In an embodiment, a system includes a first instance of an integrated circuit having an external interface with a physical pin layout having transmit and receive pins for a given particular bus located in complementary positions relative to an axis of symmetry. The system further includes a second instance of the integrated circuit having the external interface. The external interfaces of the first and second instances of the integrated circuit may be positioned such that the transmit and receive pins for the particular bus on the first instance are aligned, respectively, with the receive and transmit pins for the particular bus on the second instance.

In a further embodiment, the integrated circuit may include a plurality of transmitter circuits and a plurality of receiver circuits corresponding to respective ones of a plurality of transmit pins and a plurality of receive pins. The plurality of transmitter circuits and the plurality of receiver circuits may be arranged in a physical layout corresponding to the physical pin layout. In another embodiment, the integrated circuit may include a plurality of on-chip routers coupled to a bus circuit that supports communication on-chip and between the first and second instances of the integrated circuit. The plurality of on-chip routers may be coupled to respective portions of the external interface.

In an embodiment, the transmit and receive pins of the external interface may be grouped into sets of pins. The sets of pins may have a common number of pins, and individual ones of the plurality of on-chip routers may be assigned to a respective one or more of the sets of pins. In a further example, a particular on-chip router of the plurality of on-chip routers may include a particular number of pins, different than the common number. At least one pin of the respective one or more of the sets of pins assigned to the particular on-chip router may be unused.

In an example, a first on-chip router of the plurality of on-chip routers may be coupled to the transmit pin for a given I/O signal. A second on-chip router of the plurality of on-chip routers may be coupled to the receive pin for a given I/O signal. The first on-chip router may be coupled to the second on-chip router. In another example, the system may further include an interface wrapper wherein the interface wrapper is configured to route the transmit pin to a default pin assignment in the first on-chip router, and to route the receive pin to a non-default pin assignment in the second on-chip router.

BRIEF DESCRIPTION OF THE DRAWINGS

The following detailed description makes reference to the accompanying drawings, which are now briefly described.

FIG. 7 shows a flow diagram of an embodiment of a method for routing signals data between an external interface and on-chip routers within an integrated circuit.

Figure 1:
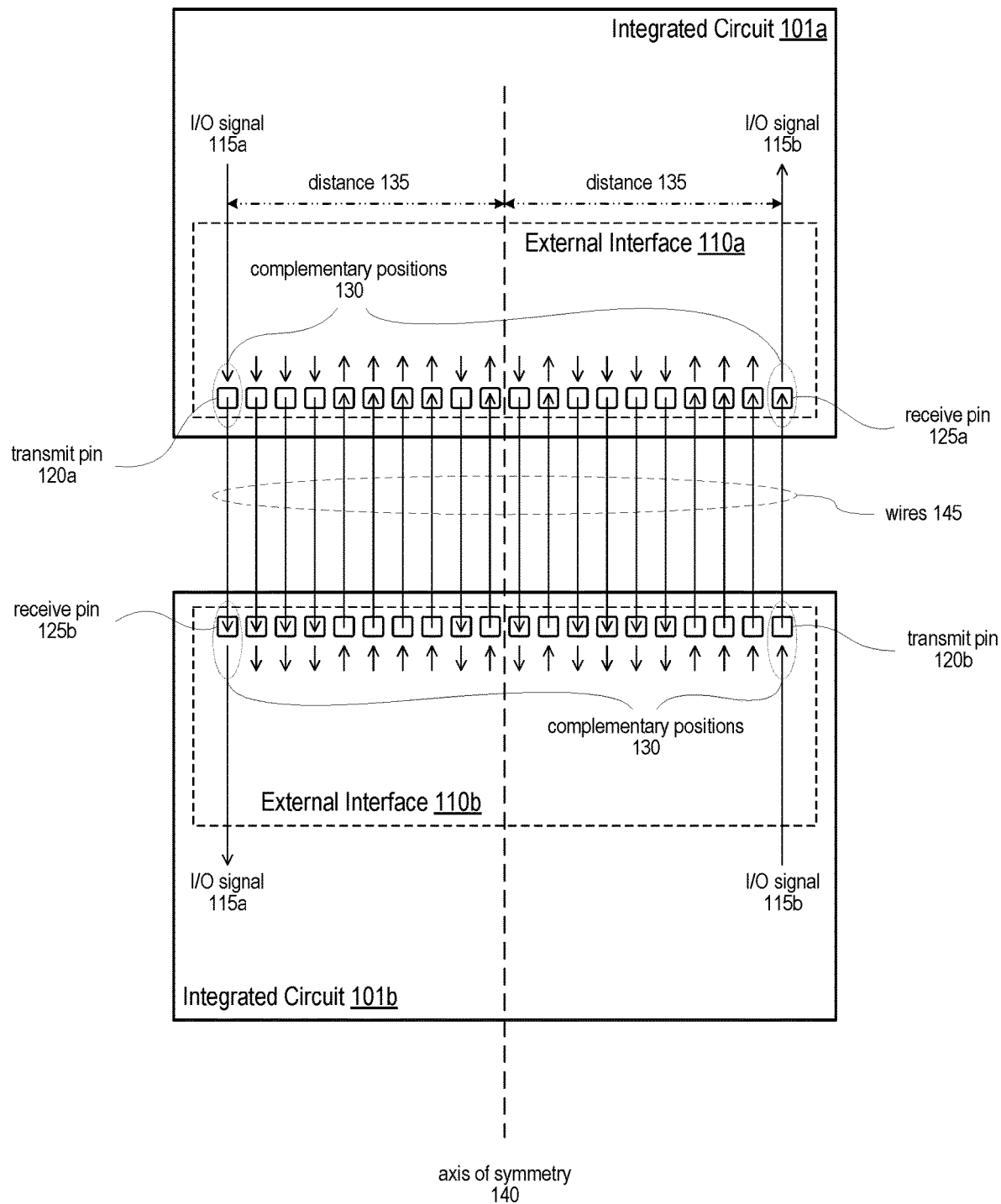
FIG. 1 illustrates a block diagram of an embodiment of a system with two integrated circuits coupled together.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, a given IC design may be used in a variety of applications having a range of performance and cost considerations. In addition, reuse of an existing IC design may reduce costs compared to designing, verifying, manufacturing, and evaluating a new IC design. One technique for scaling a single IC design across a range of applications is to utilize multiple instances of the IC in applications that emphasize performance over costs, and using a single instance of the IC in the cost sensitive applications.

Utilizing multiple instances of the IC may pose several challenges. Some applications, mobile devices for example, have limited space for multiple ICs to be included. Furthermore, to reduce latency associated with inter-IC communication, an external inter-IC interface may include a large number of pins, thereby allowing a large number of bits to be exchanged, in parallel, between two or more ICs. For example, an interface for a multi-core SOC may utilize a system-wide communication bus with hundreds or even a thousand or more signals travelling in parallel. To couple two or more of such an SOC together may require an interface that provides access to a significant portion of the communication bus, potentially requiring a hundred or more pins to be wired across the two or more die. In addition, to match or to even approach internal communication frequency of the communication bus, timing characteristics of the large number of pins of the inter-IC interface should be consistent to avoid different bits of a same data word from arriving on different clock cycles. Creating a large, high-speed interface with a single pin arrangement such that two or more instances of a same IC die can be coupled together in a small physical space may present a significant challenge to IC designers.

As will be explained further below, the present disclosure describes the use of "complementary" inter-IC interfaces. The present disclosure recognizes that such inter-IC interfaces support coupling two or more instances of a same IC design in limited space and provide scalability of an IC design to support a range of applications. Such a scalable interface may include a pin arrangement that allows for two ICs to be physically coupled with little to no crossing of wires between the two ICs when the two ICs are placed face-to-face or along a common edge of the two die. To increase consistency of performance characteristics across the pins of the interface, a single design for a smaller number of pins, e.g., sixteen, thirty-two, or the like, may be repeated until a desired number of pins for the interface are implemented. Such an inter-IC interface may allow an IC to be utilized in a wide range of applications by enabling performance increases through coupling of two or more instances of the IC. This interface may further enable the two or more ICs to be coupled together in a manner that allows the coupled ICs to be used in mobile applications or other applications in which physical space for multiple ICs is limited.

Two inter-IC interfaces may be said to be "complementary" within the meaning of this disclosure when pins having "complementary functions" are positioned such that they have "complementary layouts." A pair of interface pins have "complementary functions" if a first of those pins on one integrated circuit is designed to be received by a second of those pins on another integrated circuit. Transmit and receive are one example of complementary functions, as a transmit pin on one IC that provides an output signal of a particular bit of a data word is designed to be coupled to a receive pin on another IC that accepts the particular bit of the data word as an input signal. Similarly, a pin carrying a clock signal output is considered have a complementary function to an associated pin capable of receiving the clock signal as an input.

It is noted that the term "axis of symmetry" is used throughout this disclosure. Various embodiments of an axis of symmetry are shown in FIGS. 1, 2, 4, 5A, and 5B, and described below in reference to these figures.

Pins having complementary function have a complementary layout when the pins are located relative to an axis of symmetry of the interface such that a first integrated circuit having the interface may be positioned next to or coupled to a second instance of the integrated circuit so that the pins having the complementary functions are aligned. Such pins can also be said to be in "complementary positions." An example of a complementary layout would be transmit pins for particular signals (e.g., bit 0 and bit 1 of a data bus) being positioned the farthest and second farthest from the axis of symmetry on one side of the axis respectively, with the complementary receive pins (e.g., bit 0 and bit 1 of the data bus) being placed the farthest and second farthest from the axis of symmetry on an opposing side of the axis. In such an embodiment, a first instance of an IC having the complementary interface can be positioned relative to a second instance of the IC having the same inter-IC interface such that the transmit pins of the first instance are aligned with the receive pins of the second instance, and such that the receive pins of the first instance are aligned with the transmit pins of the second instance. As will be explained further with respect to FIGS. 5A and 5B, pins on two identical interfaces are considered to be "aligned" when the perimeters of the two interfaces are lined up and a straight line that is perpendicular to the two interfaces can be drawn through the pins in question. The concept of alignment as it pertains to pins of an interface is further described below in regards to FIGS. 5A and 5B.

Such a complementary pin layout enables the first and second instances to be coupled via their respective external interfaces without any signal paths between the two instances crossing. A pair of interface pins that have complementary functions as well as complementary positions are referred to as "complementary pins." Pairs of transmit and receive pins are used herein to demonstrate an example of complementary pins. In other embodiments, however, complementary pins may include pairs of bi-directional pins configured such that signals may be sent in either direction based on settings of one or more control signals. For example, complementary pins of a data bus may be configurable to send or receive data depending on whether data is being read or written.

It is noted that, as referred to herein, an interface may still be considered complementary when only a portion of the complementary pin functions of the interface are in complementary positions. For example, a given inter-IC interface may include pins associated with a plurality of communication buses, such as two or more of a memory bus, a display bus, a network bus, and the like. The given inter-IC interface is considered complementary when pins with complementary functions associated with at least one of the included buses are arranged in a complementary layout relative to the axis of symmetry of the given interface. Other buses of the interface, and/or other signals not directly related to a particular communication bus, may not have pins in complementary positions.

It is noted that in the examples illustrated throughout this disclosure, reference is made to usage of two or more ICs of a same design. It is contemplated that a same external interface with a same physical pin layout may be used to couple ICs of a different design. For example, a family of different IC designs may include the same external interface design across the family in order to enable various combinations of instances of two or more of the ICs. Such a variety of combinations may provide highly scalable system solution across a wide range of applications, thereby allowing, for example, use of smaller, less-expensive members of the family in cost sensitive applications and use of more-expensive, higher-performance members of the family in performance minded applications. Members of the family may also be combined with a small, low-power member for use in reduced power modes and a high-performance member for use when complex processes and/or many parallel processes need to be performed.

In some embodiments, the external interface is physically located along one edge of a die of an IC. Such a physical location may support a variety of multi-die configurations, such as placing two or more die on a co-planar surface with the edges that include the external interface being orientated nearest a neighboring die to reduce a wire length when the external interfaces are coupled. In another example, one die of a pair may be placed facing upwards while the other faces downwards, and then aligned by their respective interfaces. In an embodiment in which only a single one of the ICs is included, the placement of the external interface along one edge of the die may allow the external interface to be physically removed, for example, during a wafer saw operation.

FIG. 1 illustrates a block diagram of one embodiment of a system that includes two instances of an IC coupled via respective external interfaces. As illustrated, system 100 includes integrated circuits 101a and 101b (collectively integrated circuits 101), coupled via their external interfaces 110a and 110b (collectively external interfaces 110), respectively. Axis of symmetry 140 is shown as a vertical dashed line located perpendicular to, and through the center of, interfaces 110a and 110b. Axis of symmetry provides a reference for the physical layout of pins included in external interfaces 110, including transmit pins 120a and 120b, and receive pins 125a and 125b that are associated with a particular bus. It is noted that, as shown, interfaces 110a and 110b are centered in, respectively, integrated circuits 101a and 101b. In other embodiments, however, an external interface may be positioned closer to a particular side of the integrated circuit.

As shown, integrated circuit 101a includes external interface 110a with a physical pin layout having transmit pin 120a and receive pin 125a for a particular bus located in complementary positions 130 relative to axis of symmetry 140. Integrated circuit 101a is an IC design that performs any particular function with a finite amount of bandwidth. For example, integrated circuit 101a may be a general-purpose microprocessor or microcontroller, a digital-signal processor, a graphics or audio processor, or other type of system-on-a-chip. In some applications, a single instance of an integrated circuit 101 may provide suitable performance bandwidth. In other applications, multiple integrated circuits 101 may be used to increase performance bandwidth. In some applications, the multiple integrated circuits 101 may be configured as a single system in which the existence of multiple integrated circuits is transparent to software executing on the single system.

As shown in FIG. 1, receive pin 125b in external interface 110b is complementary to transmit pin 120a of external interface 110a. Accordingly, I/O signal 115a sent via transmit pin 120a is common to I/O signal 115a received by receive pin 125b. In a similar manner, receive pin 125a of external interface 110a is complementary to transmit pin 120b of external interface 110b. I/O signal 115b transmitted by transmit pin 120b, therefore, is a common signal to I/O signal 115b, received by receive pin 125a. I/O signal 115a may, for example, correspond to a data bit 0 of the particular bus in integrated circuits 101a and 101b. Accordingly, I/O signal 115b would also correspond to data bit 0 of the particular bus in integrated circuits 101a and 101b.

As illustrated, a complementary pin layout is enabled by placing transmit pin 120a and receive pin 120a in a same order relative to axis of symmetry 140, each pin being the tenth pin from axis of symmetry 140. In the illustrated embodiment, transmit pin 120a and receive pin 120a are also shown as being located a same physical distance 135 from, but on opposing sides of, axis of symmetry 140. The two instances of external interface 110, therefore, may be capable of being coupled directly to one another. Although such a physical pin symmetry may enable a desirable pin alignment when integrated circuit 101b is rotated into an opposing position from integrated circuit 101a, this degree of pin symmetry is not considered a requirement for all embodiments of complementary interfaces.

As illustrated, integrated circuit 101a is coupled to a second instance, integrated circuit 101b. Integrated circuits 101a and 101b are two instances of a same IC, and therefore, include respective instances of the same circuits, same features, and, as shown, the same external interface 110. Accordingly, integrated circuit 101b includes external interface 110b with a physical pin layout having transmit pin 120b and receive pin 125b for the given input/output (I/O) signal located in complementary positions relative to axis of symmetry 140.

To couple integrated circuits 101, external interfaces 110 of the first and second instances of integrated circuit 101 are positioned such that transmit pin 120a and receive pin 125a for I/O signal 115 on integrated circuit 101a are aligned, respectively, with receive pin 125b and transmit pin 120b for I/O signal 115 on integrated circuit 101b. By rotating the die of integrated circuit 101b 180 degrees and placing a common edge of the two integrated circuits 101 adjacent to each other, transmit pin 120a of integrated circuit 101a is physically located adjacent to receive pin 125b of integrated circuit 101b. Similarly, receive pin 125a of integrated circuit 101a is physically located adjacent to transmit pin 120b of integrated circuit 101b. As used herein, "adjacent" refers to a physical location of two or more circuit elements arranged such that wires coupling the two elements do not cross wires of neighboring sets of similar elements. For example, in terms of pins of the two external interfaces, adjacent pins indicates that a wire from a given pin of the first instance to a complementary pin of the second instance does not cross a wire used to couple any of the neighboring pins of the first and second instances.

Transmit pin 120a is coupled to receive pin 125b and receive pin 125a is coupled to transmit pin 120b, via respective wires 145. It is noted, that as used herein, a "wire" refers to any suitable conductive medium that allows a signal to be transferred between coupled pairs of transmit and receive pins of external interfaces 110. For example, a wire may correspond to a bond wire attached between transmit pin 120a and receive pin 125b. Additionally, an interposer device may be used couple the pins of external interface 110a to the pins of external interface 110b. In some embodiments, integrated circuit 101a may be flipped over and attached, face-to-face, to integrated circuit 101b, either with or without an interposer device between the two integrated circuit die.

Other pins of external interface 110 may also be arranged in similar complementary positions, such that for a group of transmit pins of external interface 110, a complementary group of receive pins are located in a same order relative to axis of symmetry 140, on the opposite side from the group of transmit pins. Such a layout results in a symmetric pin arrangement in which a pair of pins that are a same number of pins from axis of symmetry 140, but on opposite sides, have complementary functions, e.g., one pin of the pair a transmit pin and the other a receive pin.

Using this complementary pin layout, sending data by integrated circuit 101*a* includes sending a portion of a data packet via transmit pin 120*a* that is located a particular distance from axis of symmetry 140, and receiving, by integrated circuit 101*b*, the portion of the data packet via receive pin 125*b* that is located the same particular distance from axis of symmetry 140. Similarly, the remaining portions of the data packet are sent by other transmit pins, in parallel with the first portion, to complementary receive pins that are located equidistant from axis of symmetry 140. It is noted that the complementary pin layout may also result in wires 145 connected between external interface 110*a* and 110*b* being similar in length. This similarity may help to enable the data packet being sent as well as received in parallel, thereby reducing skew between different bits of the data packet as well as any clock signals used to sample the data packet.

By utilizing the complementary pin layout described above, an external interface may be implemented on an integrated circuit that allows multiple instances of the integrated circuit to be coupled together in a fashion that enables use in space constrained applications while satisfying a performance requirement of the application. Reuse of an existing integrated circuit across an increased range of applications may reduce design and production costs associated with otherwise designing a new integrated circuit to satisfy the performance requirements of one or more applications of the increased range.

It is noted that system 100, as illustrated in FIG. 1, is merely an example. The illustration of FIG. 1 has been simplified to highlight features relevant to this disclosure. Various embodiments may include different configurations of the circuit elements. For example, external interface 110 is shown with twenty pins. In other embodiments, any suitable number of pins may be included in the external interface, including for example, over one thousand pins. Although only two instances of the integrated circuit are shown, it is contemplated that additional instances may be included in other embodiments. Axis of symmetry 140 is depicted as being through the center of integrated circuits 101*a* and 101*b*. In other embodiments, the external interface, and therefore the axis of symmetry, may be positioned off-center of the integrated circuit.

The integrated circuit illustrated in FIG. 1 is shown only with an external interface. Various integrated circuits may include any suitable number of additional circuit blocks. One example of an integrated circuit with additional circuit blocks is shown in FIG. 2.

Figure 2:
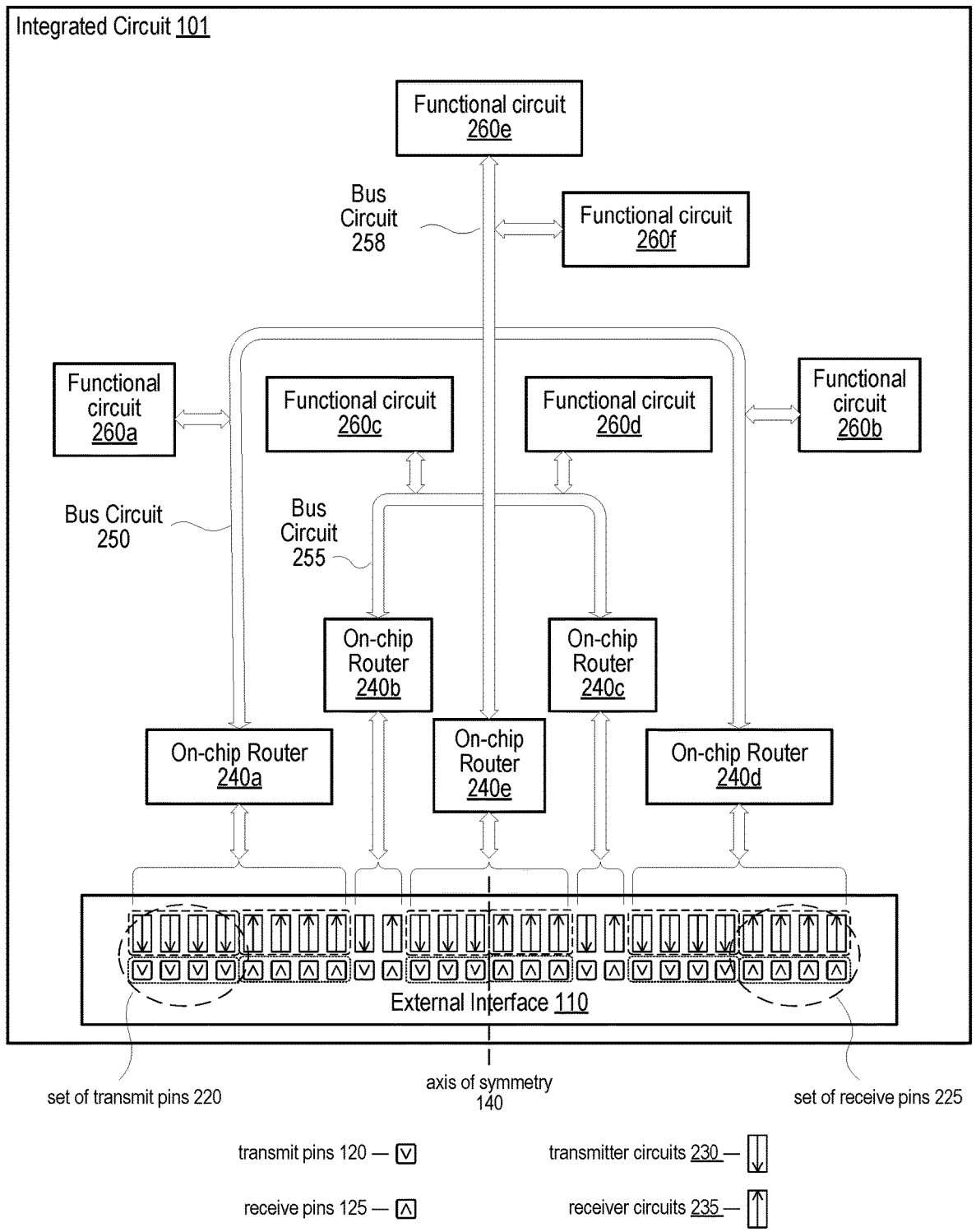
FIG. 2 shows a block diagram of an embodiment of an integrated circuit with an external interface.

Moving to FIG. 2, a diagram of an embodiment of an integrated circuit with an external interface is shown. As illustrated, integrated circuit 101 includes external interface 110 coupled to on-chip routers 240*a*-240*e* which, in turn, are coupled to respective ones of several bus circuits including bus circuits 250, 255 and 258. The various bus circuits are coupled to respective sets of functional circuits 260*a*-260*f*. External interface 110 is shown with a plurality of transmit pins 120 and receive pins 125, as well as associated transmitter circuits 230 and receiver circuits 235. Integrated circuit 101, as shown, corresponds to an IC design for both integrated circuits 101*a* and 101*b* in FIG. 1.

As illustrated, bus circuits 250-258 are configured to transfer given data among the plurality of functional circuits 260*a*-260*f* (collectively functional circuits 260). Bus circuits 250, 255, and 258 provide respective communication paths between various sets of functional circuits, including external interface 110 and respective sets of functional circuits 260. Each of the bus circuits 250-258 may support a respective set of network protocols and/or particular types of data. For example, bus circuit 258 may be used for transferring graphics data, while bus circuit 250 may support general purpose data, and bus circuit 255 is used for audio data.

Bus circuits 250, 255, and 258 may collectively form a communication fabric within integrated circuit 101 for transferring data transactions between various functional circuits 260 and additional functional circuits that are not illustrated. To access external interface 110, and therefore, another instance of integrated circuit 101, each of bus circuits 250-258 is coupled to a respective one or more of on-chip routers 240 that is, in turn, coupled to one or more transmitter circuits 230 and receiver circuits 235 included in external interface 110. On-chip routers 240*a* and 240*d*, as shown, provide different access points into bus circuit 250, and may be physically located at different locations on integrated circuit 101, such as near the associated transmitter and receiver circuits. Similarly, on-chip routers 240*b* and 240*c* provide different access points into bus circuit 255, and on-chip router 240*e* provides an access point into bus circuit 258.

As illustrated, a plurality of transmitter circuits 230 in external interface 110 are coupled to a particular set of transmit pins 220, and a plurality of receiver circuits 235 are coupled to a particular set of receive pins 225. These transmitter circuits 230 and receiver circuits 235 may be physically located by their corresponding set of transmit pins 220 and set of receive pins 225. Such a co-location of these circuits may reduce timing skew between a point in time when a given one of the set of transmitter circuits 230 in a first instance of integrated circuit 101 asserts a particular signal level and a later point in time when a corresponding one of the set of receiver circuits on a second instance of integrated circuit 101 receives the asserted signal level. This timing skew may increase in IC designs in which the transmitter circuits 230 and/or receiver circuits 235 are placed farther away from their respective transmit and receive pins.

The particular set of transmit pins 220 is arranged in a particular layout relative to axis of symmetry 140 of external interface 110. The particular set of receive pins 225 is arranged in a complementary layout to the particular layout, relative to axis of symmetry 140. Accordingly, when two instances of integrated circuit 101 are placed facing one another, with one of the instances flipped 180 degrees from the other instance, the given transmit pin 120 is aligned with the corresponding receive pin 125. External interface 110 is configured to transfer particular data between bus circuits 250-258 and the other instance of integrated circuit 101.

On-chip routers 240 transfer the particular data between an associated bus circuit 250-258 and external interface 110 via a plurality of signals. On-chip routers 240 may be configured to queue one or more data packets to send to a respective one of bus circuits 250-258 and/or queue one or more data packets received from the respective bus circuit. For example, on-chip router 240*a* may receive a series of data packets from the other instance of integrated circuit 101 via external interface 110. In some embodiments, on-chip router 240a may buffer one or more data packets of the series while waiting for available bandwidth in bus circuit 250 before sending the received data packets. The reverse may also occur, with on-chip router 240a buffering data packets from bus circuit 250 while waiting for bandwidth to send the packets to the other instance of integrated circuit 101. In other embodiments, on-chip router 240a may cause functional circuit 260a or 260b to delay sending a data packet until bandwidth on bus 250 and/or resources in a destination circuit are available to receive the data packet. In addition, on-chip routers 240 may include logic circuits for determining a final destination for a received data packet, e.g., a particular one (or more) of functional circuits 260. In some embodiments, on-chip routers 240 may convert data signals received from external interface 110 using one type of data protocol into a different type of data protocol compatible with the associated bus circuit.

As disclosed, integrated circuit 101 includes the plurality of transmitter circuits 230 and the plurality of receiver circuits 235 that correspond to respective ones of the plurality of transmit pins 120 and the plurality of receive pins 125. Transmitter circuits 230 include circuitry for driving data signals onto corresponding transmit pins 120. For example, transmitter circuits 230 may include driver circuits configured to receive a particular voltage level from a signal generated by an associated on-chip router 240 and then generate a corresponding voltage level on an associated transmit pin 120 such that a corresponding receiver circuit 235 in the other instance of integrated circuit 101 can detect this voltage level. Receiver circuits 235 may, for example, include input circuits configured to detect if the received voltage level on a corresponding one of receive pins 125 is above or below a particular voltage threshold, and then generate a corresponding logic level on a signal sent to an associated on-chip router 240. Transmitter circuits 230 and receiver circuits 235, as shown, are arranged in a physical layout that corresponds to the particular complementary layout, relative to axis of symmetry 140.

On-chip routers 240 includes a pair of on-chip routers (e.g., on-chip routers 240a and 240d) that are coupled to a common bus circuit (e.g., bus circuit 250). On-chip router 240a is coupled to a particular set of transmit and receive pins of external interface 110 located on the left side of axis of symmetry 140. On-chip router 240d is coupled to a different set of transmit and receive pins of the external interface located on the right side of axis of symmetry 140, complementary to the particular set of transmit and receive pins. For example, a given transmit pin 120 coupled to on-chip router 240a has a corresponding complementary receive pin 125 coupled to on-chip router 240d.

An example of a data exchange between a particular functional circuit of a first instance of integrated circuit 101 (e.g., functional circuit 260a) and a different functional circuit of a second instance of integrated circuit 101 (e.g., a second instance of functional circuit 260b) includes sending, by the functional circuit 260a in the first instance, first data via the set of transmit pins 220 of external interface 110 of the first instance. This sending comprises transmitting a particular set of signals to the second instance via external interface 110 using on-chip router 240a. Receiving the first data, by the second instance, comprises receiving, by the second instance, the particular set of signals via a set of receive pins 225 of external interface 110 that are coupled to on-chip router 240d in the second instance. On-chip router 240d may then route the received first data to the second instance of functional circuit 260b via bus circuit 250 of the second instance.

Data sent from functional circuit 260b of the second instance to functional circuit 260a of the first instance repeats this process. The second instance of integrated circuit 101 sends second data via the set of transmit pins 220 of external interface 110 of the second instance, including transmitting a different set of signals to the first instance via external interface 110 using on-chip router 240a of the second instance. Receiving, by the first instance, the second data via the set of receive pins 225 of external interface 110 of the first instance comprises receiving a different set of signals from the second instance via external interface 110 using on-chip router 240d of the first instance. The received second data is then routed to functional circuit 260a via bus circuit 250 of the first instance. Data, therefore, may be exchanged between the two instances of integrated circuit 101 using the corresponding sets of complementary transmit pins 120 and receive pins 125.

Furthermore, on-chip router 240a is coupled, via bus circuit 250 to on-chip router 240d and to the set of transmit pins 220. Similarly, on-chip router 240d is coupled to the set of receive pins 225. Functional circuit 260a in the first instance may, therefore, send and receive data via external interface 110 using the complementary set of on-chip routers 240a and 240d. Function circuit 260b of the second instance may similarly send and receive data via external interface 110 using the complementary set of on-chip routers 240a and 240d of the second instance. Accordingly, the coupled external interfaces 110 of the first and second instances may enable the respective communication fabrics of the two instances to function as a single, coherent communication fabric, thereby allowing data packets to be exchanged between functional circuits on opposite dies in a manner similar to data packets exchanged between two functional circuits on a same die. From an functional perspective, the two instances of integrated circuit 101 may perform as a single integrated circuit.

It is noted that the embodiment of FIG. 2 is one example. In other embodiments, a different combination of elements may be included. For example, a different number of bus circuits and/or on-chip routers may be included. Although FIG. 2 depicts 26 pins included in external interface 110, in other embodiments, any suitable number of pins may be included.

In the description of FIGS. 1 and 2, various pairs of pins of external interface 110 are described as complementary. In some embodiments, an order of bits of data transmitted across a particular set of transmit pins of a first instance of an IC may not align directly with the complementary set of receive pins of a second instance of the IC. An embodiment of an IC that demonstrates how misalignment of data bits may be addressed is shown in FIG. 3.

Figure 3:
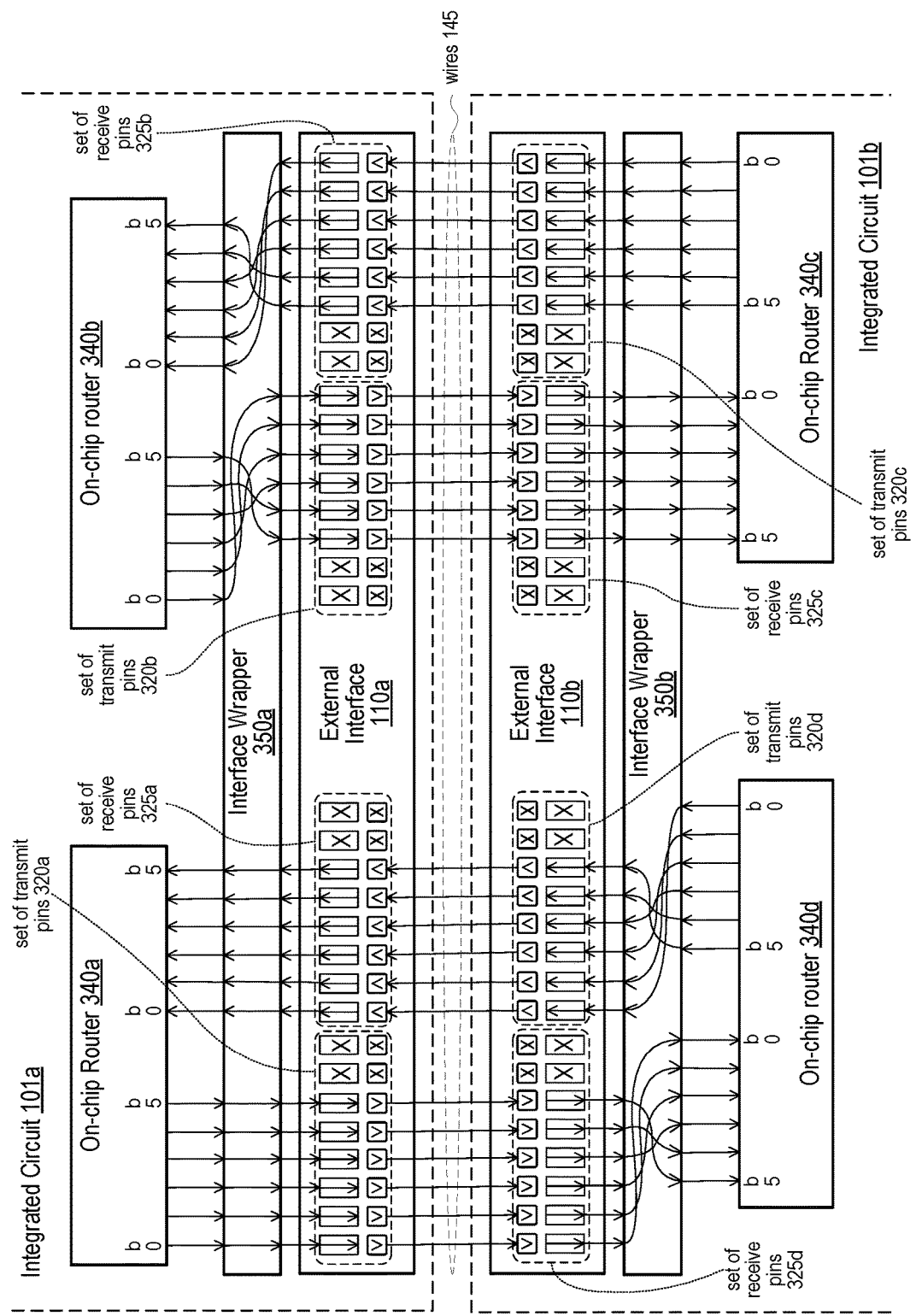
FIG. 3 depicts a block diagram of a system with two integrated circuits utilizing an interface wrapper to route pin assignments of respective external interfaces.

Turning to FIG. 3, two instances of integrated circuit 101 are shown, coupled via their respective instances of external interface 110. As shown, system 300 depicts an embodiment in which received data is misaligned from the transmit data. System 300 includes integrated circuits 101a and 101b, each with a respective external interface 110a and 110b, and a respective pair of on-chip routers: on-chip routers 340a and 340b in integrated circuit 101a and on-chip routers 340c and 340d on integrated circuit 101b. For the illustrated example, on-chip router 340a of integrated circuit 101a corresponds to on-chip router 340c of integrated circuit 101b. In a similar manner, on-chip router 340b corresponds to on-chip router 340d. Each of integrated circuits 101a and 101b further includes a respective one of interface wrappers 350a and 350b, that are configured to route individual signals between the respective on-chip routers and the external interfaces.

As illustrated, the transmit and receive pins of external interface 110a and 110b are grouped into sets of pins, including respective transmitter and receiver circuits. These sets of pins have a common number of pins, eight in the illustrated example, although any suitable number may be used. This common number of pins may be used to standardize a design for the sets of pins. Each set of pins may include a common set of signals for controlling clock signals, power, and the like. For example, each pin of a given set receives a same gated clock signal and may be coupled to a same gated power node and/or a same gated ground reference node. Utilizing a small number (e.g., one or two) of designs for the sets of pins may decrease a development time for the external interface as well as increase a uniformity for the placement, as well as for the performance characteristics (e.g., rise and fall times), for each of the pins of external interfaces 110a and 110b. As previously disclosed, although only thirty-two pins are illustrated for each instance of external interface 110, external interface 110 may actually include hundreds or thousands of pins. Accordingly, standardizing sets of pins to be implemented in the interface design as one unit, may result in a significant reduction to the times required for designing and validating external interface 110.

Individual ones of the plurality of on-chip routers 340a-340d are assigned to a respective one or more of the sets of pins. For example, on-chip router 340a is assigned to set of transmit pins 320a and set of receive pins 325a. Likewise, on-chip routers 340b-340d are assigned to a respective set of transmit pins and a respective set of receive pins. In various embodiments, these assignments may be fixed or may be programmable, e.g., sets of pins are assigned by setting a particular configuration register (not shown). It is noted that receive and transmit pins are grouped into separate sets in the depicted embodiment. In other embodiments, as will be shown below, a set of pins may include both transmit and receive pins.

In addition, individual ones of the plurality of on-chip routers 340a-340d are assigned to a respective bus circuit and are therefore coupled to a plurality of functional circuits included on a same integrated circuit 101. In some embodiments, a physical orientation of on-chip routers 340 may be implemented in preference to the particular bus circuit to which the on-chip router is coupled. For example, on-chip routers 340a and 340b may be instantiated such that they are rotated 180 degrees from one to another in order to be aligned to a common bus circuit that wraps around integrated circuit 101a. In such an embodiment, the pins of on-chip router 340b may not align to the set of receive pins 325b and/or the set of transmit pins 320b of external interface 110a. Additionally, interface wrapper 350a may include several instances of a same component that are instantiated 180 degrees from one to another. In such a case, transmit and receive pins of interface wrapper 350a may not align to the pins of external interface 110a. Accordingly, a capability to reroute pins signals through interface wrapper 350a may be desired.

As shown, each of on-chip routers 340a-340d includes six output signals and six input signals, different than the common number of pins, eight. Accordingly, two pins of each sets of pins 320 and 325 that are assigned to each on-chip router 340 are unused. On-chip routers 340a-340d each support a particular network protocol, as described above in regard to FIG. 2. In some cases, such as shown in FIG. 3, a particular network protocol may not include a number of pins that aligns with the common number of pins included in the sets of pins. Since removing the extra pins could impact performance characteristics of the remaining pins (e.g., a parasitic capacitance seen by each of the remaining pins could differ, thereby impacting rise and fall times), in some embodiments the extraneous pins are left in the respective sets.

Each set of transmit pins 320, as shown, includes a transmit buffer and, similarly, each set of receive pins 325 includes a receive buffer. Since eight transmit pins or eight receive pins are included in each set, the respective transmit and receive buffers may be accessed as a byte of data. For example, on-chip router 340a may send data to on-chip router 340d. On-chip router 340a sends six output signals to interface wrapper 350a. Interface wrapper 350a is configured to route set of transmit pins 320a to a default pin assignment in on-chip router 340a. As shown, this default assignment is a straight-through assignment in which a bit 0 of set of transmit pins 320a is coupled a bit 0 of on-chip router 340a, and so on to a bit 5 of the set of transmit pins 320a assigned to a bit 5 of on-chip router 340a. This bit assignment assumes that the bit 0 corresponds to the left-most pin of the sets of pins in external interface 110a.

Note that integrated circuit 101b is rotated 180 degrees in relation to integrated circuit 101a. Accordingly, bit 0 corresponds to the right-most pin of the sets of pins in external interface 110b. Since wires 145 between external interface 110 and 110b are, as shown, straight across, bit 0 of set of transmit pins 320 is coupled to bit 7 of set of receive pins 325d and, similarly, bit 5 of set of transmit pins 320a is coupled to bit 2 of set of receive pins 325d. Accordingly, interface wrapper 350b routes set of receive pins 325d using a non-default pin assignment to on-chip router 340d.

In a similar manner, sending data from on-chip router 340d to on-chip router 340a may include sending, by on-chip router 340d, signals via set of transmit pins 320d of external interface 110b using a non-default pin assignment to route set of transmit pins 320d to on-chip router 340d. Receiving, by on-chip router 340a, the data via set of receive pins 325a of external interface 110a comprises routing set of receive pins 325a to on-chip router 340a using the default pin assignment.

In some embodiments, interface wrappers 350a and 350b may adjust routing between a given on-chip router 340 and the transmit and receive pins of the assigned set (or sets) of pins on any given clock cycle during which no data is being transferred by the given on-chip router 340. For example, an amount particular of data may be sent between on-chip router 340b and on-chip router 340c. Interface wrapper 350a routes, for a first portion of the particular data, the plurality of signals between on-chip router 340b and set of transmit pins 320b using a first pin assignment, and then re-routes, for a second portion of the particular data, the plurality of signals between on-chip router 340b and set of transmit pins 320b using a second pin assignment different from the first pin assignment.

Integrated circuits 101a and 101b, e.g., may each include one or more processing cores capable of executing instructions of a particular instruction set architecture. Accordingly, instructions of a particular program may cause a core to modify the pin assignments in interface wrappers 350a and/or 350b at particular points in time, or for particular types of data. For example, image data may be sent using one pin assignment and then switch to a different pin assignment for audio data or for commands associated with the image data. In addition, interface wrapper 350a and 350b may be capable of rerouting pin assignments for one on-chip router while a different router on the same IC is sending or receiving data.

It is noted that the examples of FIG. 3 are merely for demonstrating disclosed concepts. System 300 has been simplified to clearly illustrate the described techniques. In other embodiments, additional sets of transmit and receive pins may be included in the external interfaces as well as additional on-chip routers. Other circuit blocks of integrated circuits 101a and 101b have been omitted for clarity.

Figure 4:
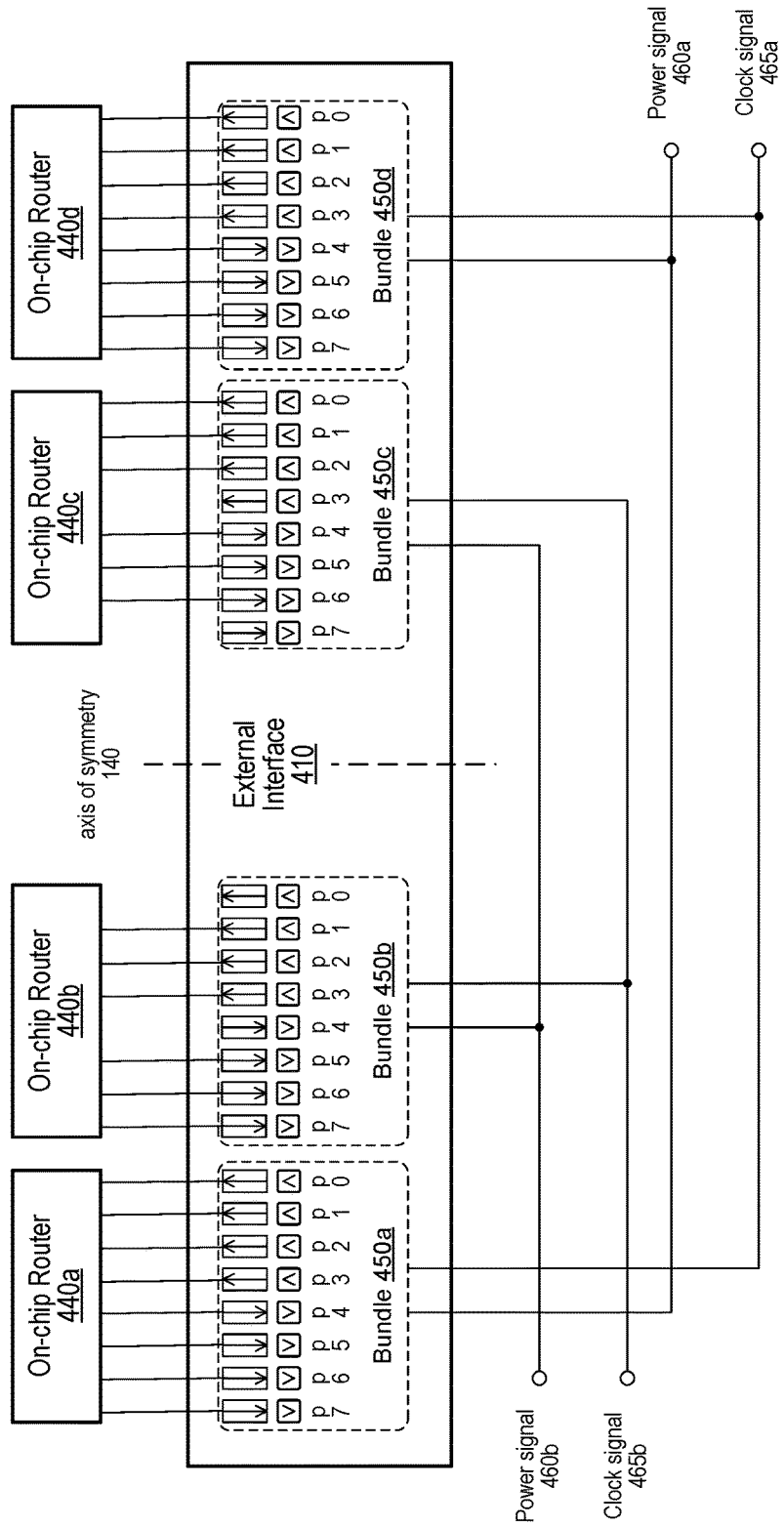
FIG. 4 illustrates a block diagram of an embodiment of an integrated circuit with an external interface utilizing pin bundles.

FIG. 3 describes how sets of pins in the external interface may be implemented and utilized. Various techniques may be utilized for implementing such sets of pins. In FIG. 3, the pins of the external interface are grouped into sets of transmit pins that are separate from the sets of receive pins. FIG. 4 illustrates another example for grouping sets of pins that include both transmit and receive pins.

Proceeding to FIG. 4, a block diagram of an embodiment of an integrated circuit with an external interface is shown. In the illustrated embodiment, integrated circuit 101 includes external interface 410 and on-chip routers 440a-440d (collectively on-chip routers 440). External interface 410 includes four sets of transmit and receive pins, bundles 450a-450d (collectively bundles 450), in which the transmit and receive pins are arranged in a complementary layout relative to axis of symmetry 140. Each of the illustrated bundles 450a-450d includes eight pins, four transmit pins and four receive pins.

As illustrated, the transmit and receive pins of external interface 410 are grouped into sets of pins, bundles 450a-450d, wherein each of bundles 450 have a common number of pins (eight). On-chip routers 440 are assigned to a respective one of bundles 450. In other embodiments, however, one or more of on-chip routers 440 may be assigned to two or more bundles 450. As described above, sets of transmit and receive pins may be implemented using standardized bundles 450 in order to increase consistency across the pins of external interface 410. Within each bundle 450, the included transmit and receive pins share a common power signal and clock signal.

Each bundle 450 may be coupled to any appropriate power signal and clock signal. As shown, bundles 450a and 450d are coupled to receive power signal 460a and clock signal 465a, while bundles 450b and 450c are coupled to receive power signal 460b and clock signal 465b. In some embodiments, power signal 460a may be controlled independently from power signal 460b, including for example, using a different voltage level and/or implementing different power gates to enable/disable the respective bundles 450. In a similar manner, clock signal 465a may also be controlled independently from clock signal 465b. According clock signal 465a may be enabled and/or set to a particular frequency independently from clock signal 465b. In the present embodiment, bundles 450a and 450d are a complementary pair, as are bundles 450b and 450c. In addition to using a standardized pin bundle to implement each of bundles 450, use of common power and clock signals for a complementary pair of bundles 450 may further increase performance consistency between the two bundles 450 of a complementary pair.

As shown, on-chip routers 440a and 440d are assigned to bundles 450a and 450d, respectively. In a similar manner, on-chip routers 440b and 440c are respectively assigned to bundles 450b and 450c. On-chip routers 440a and 440d include a same number of transmit and receive pins as are included in a standardized bundle, resulting in no unused pins in bundles 450a and 450d. On-chip routers 440b and 440c, in contrast, include fewer transmit and receive pins than the common number of pins included in a standardized bundle, resulting in one unused transmit pin and one unused receive pin in bundles 450b and 450c, respectively.

On-chip routers 440a and 440d, as illustrated, may send data packets via bundles 450a and 450d using all transmit pins of the respective bundles. At a different point in time, however, on-chip routers 440a and 440d may send a plurality of data packets, wherein ones of the plurality of data packets include a smaller number of bits, resulting in fewer than all transmit pins of the respective bundle 450 being used. Likewise, when receiving data packets, fewer than all receive pins in bundle 450a and 450d may be used to receive a given data packet.

It is noted that FIG. 4 is merely one example of the disclosed concepts. Although four on-chip routers and four pin bundles are shown, any suitable number may be included in other embodiments. As illustrated, four transmit pins and four receive pins are shown within each pin bundle. In other embodiments, any suitable number of transmit and receive pins may be included. In some embodiments, the number of transmit pins may be different than the number of receive pins. In other embodiments, transmit and receive pins may be implemented in separate bundles.

Figure 5A:
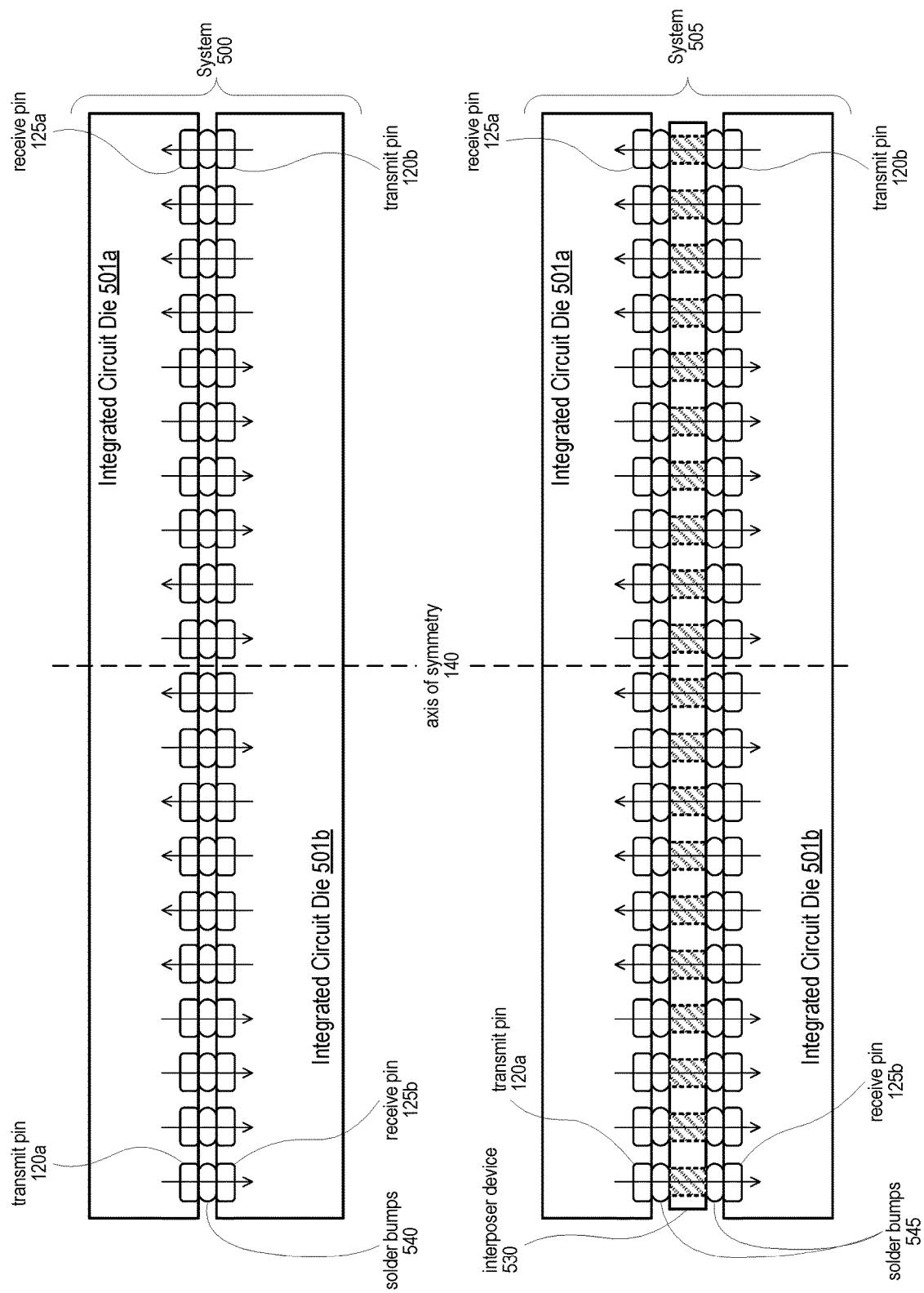
FIG. 5A depicts two examples of two integrated circuits coupled together using complementary interfaces.
Figure 5B:
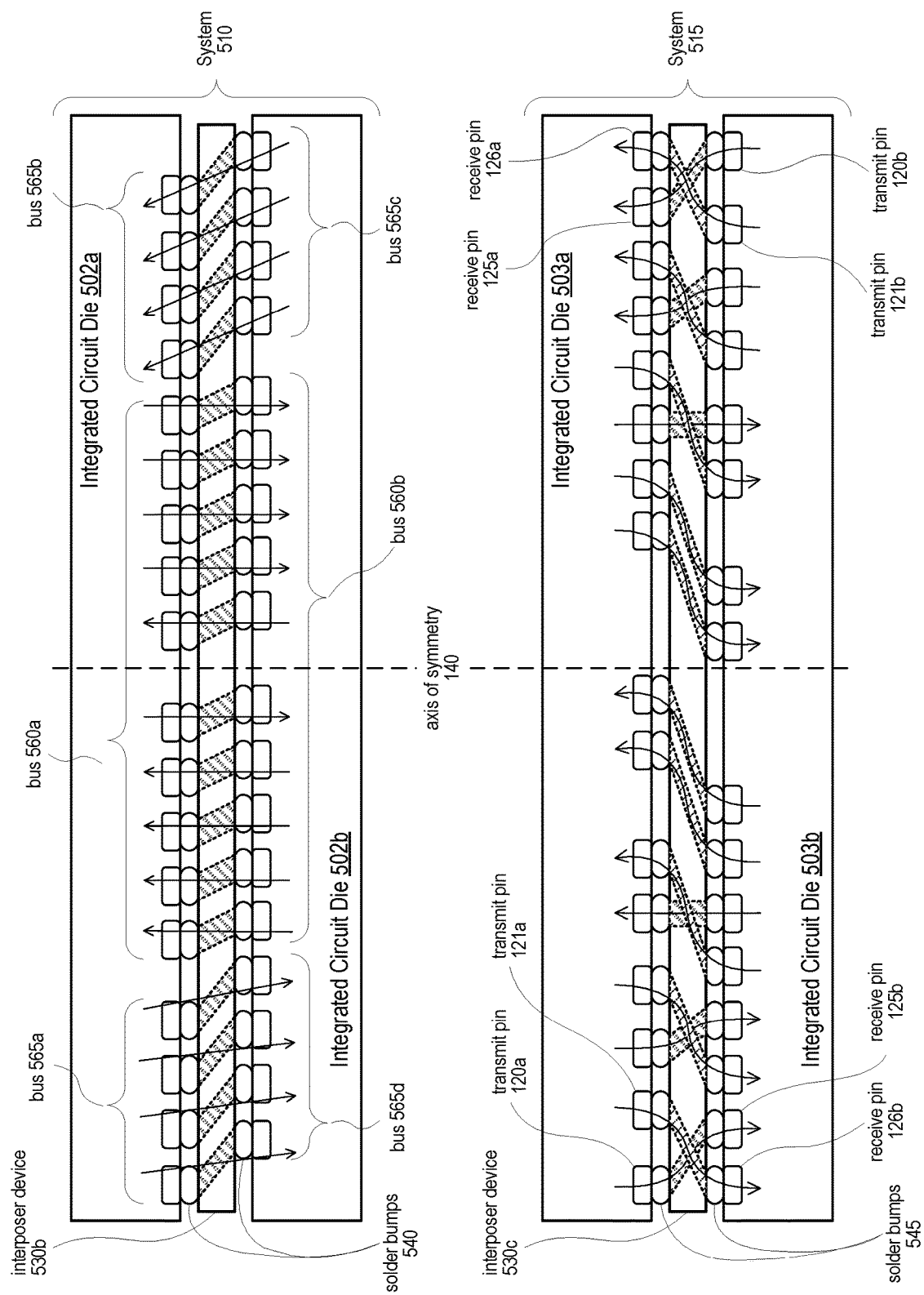
FIG. 5B depicts two additional examples of two integrated circuits coupled together.

In FIGS. 1 and 3, two integrated circuits are shown coupled via their respective external interfaces. In some embodiments, the two integrated circuits may be placed on a co-planar surface with both ICs facing a same direction and with one IC rotated such that the pins of their respective external interfaces are aligned in a manner that allows the pins of the two external interfaces to be coupled without crossing any wires. In other embodiments, as shown in FIGS. 5A and 5B, two ICs may be attached, face-to-face, with their respective external interfaces aligned. FIG. 5B further depicts an example of two die that are coupled via a non-aligned external interface.

Proceeding now to FIG. 5A, two embodiments are depicted for attaching two integrated circuits together via an external interface. In one embodiment, system 500 shows integrated circuit die 501a coupled to integrated circuit die 501b using solder bumps 540. In another embodiment, system 505 depicts integrated circuit die 501a coupled to integrated circuit die 501b using interposer device 530, as well as two sets of solder bumps 545. In the present embodiment, integrated circuit die 501a and 501b correspond to integrated circuits 101a and 101b in FIG. 1.

As shown in FIG. 1, the external interfaces of integrated circuits 101a and 101b may be coupled using wires (e.g., soldered bond wires or microstrip conductors deposited on circuit boards) with the two dies placed on a co-planar surface, the faces of both dies facing a same direction. Such a technique may enable a low cost assembly solution, but may require a surface area of an associated circuit board that is larger than a footprint of the two dies. To reduce this footprint, system 500 includes two integrated circuit die 501a and 501b placed face-to-face with pins of the respective external interfaces aligned and soldered directly to one another using solder bumps 540. For example, transmit pin 120a is soldered directly to receive pin 125b and receive pin 125a is soldered directly to transmit pin 120b. The complementary pin layout described above for the external interfaces 110 in FIG. 1 enables this direct soldering between different instances of the same interface. Placement of complementary pairs of pins equidistant from axis of symmetry 140 provides the alignment that enables the direct connections.

System 505 presents a similar solution as system 500, but with an addition of interposer device 530a to provide a conductive connection between an external interface of each die. In system 505 transmit pin 120a of integrated circuit die 501a is soldered to a particular pin of interposer device 530a. This particular pin is then soldered to receive pin 125b. In a like manner, receive pin 125a is soldered to a different pin of interposer device 530a, which in turn, is soldered to transmit pin 120b. Although interposer device 530a may allow routing of pins of integrated circuit die 501a to pins of integrated circuit die 501b that are not physically aligned, use of the complementary pin layout for the external interfaces of integrated circuit die 501a and 501b allows interposer device 530a to have conductive paths between the two die straight across. Such a straight connection may reduce a physical path between pins of integrated circuit 501a and 501b, as compared to routing connections between misaligned pins on the two die. Use of interposer device 530a may further allow routing of one or more pins of the external interfaces or other pins of either of integrated circuit die 501a and 501b to an edge of interposer device 530 where the pins may, for example, be coupled to other integrated circuits.

In FIG. 5A, the pins of the external interfaces of integrated circuits 501a and 501b are depicted with complementary pins that are equidistant from axis of symmetry 140. In some embodiments, not all pins of an interface may include such an equidistant pin layout. Turning now to FIG. 5B, two more examples of two coupled ICs are shown. The ICs included in systems 510 and 515, however, do not include pins that are all equidistant from the axis of symmetry.

As illustrated, system 510 demonstrates an example of an external interface that includes complementary pins. Similar to integrated circuit die 501a and 501b, integrated circuit die 502a and 502b are two instances of a same integrated circuit design that are coupled through a common external interface design. The pins of the external interface of integrated circuit die 502a and 502b include transmit and receive pins for two buses, bus 560 and bus 565. The pins for bus 565 are split into two sections per die, bus 565a and 565b on integrated circuit die 502a, and bus 565c and 565d on integrated circuit die 502b. Each die also includes respective pins for bus 560, 560a on integrated circuit die 502a and 560b on integrated circuit die 502b. The complementary pins of bus 565a and 565d are not equidistant from axis of symmetry 140, and although the pins are arranged in a same order, a straight line that is parallel to the edges of the die cannot be drawn through the pins of buses 565a and 565d, and similarly with the pins of buses 565b and 565c. Accordingly, the pins of bus 565 are not aligned.

As shown, pins of bus 560a that have complementary functions also are not arranged equidistant from axis of symmetry 140. Unlike the pins of bus 565, however, lines parallel to the edges of the die can be drawn through the complementary pairs of pins of buses 560a and 560b. Accordingly, the pins of bus 560 are aligned.

System 515, as presented, demonstrates an example of an external interface that is not complementary. Like system 510, system 515 includes two instances of a same integrated circuit design, integrated circuit die 503a and 503b. In system 515, the pins of the external interface are not aligned, and as a result, multiple signal paths cross. For example, the signal path between transmit pin 120a and receive pin 125b crosses the path from transmit pin 121a and receive pin 126b. On the opposite side of axis of symmetry 140, the signal path between transmit pin 120b and receive pin 125a crosses the path from transmit pin 121b and receive pin 126a. Due to this misalignment, integrated circuits 503a and 503b are not considered to have a complementary interface.

It is noted that that alignment of complementary pins of an external interface may result in a reduction of noise coupling between adjacent signals. When two or more signal paths cross, the wires carrying the signals may come into close proximity, which in turn, may increase a susceptibility to noise coupling in which a first signal path receives electromagnetic interference from signal transitions on a second signal path. The closer the two signal paths, the greater the susceptibility to noise being transmitted between the two paths. By aligning the pins of the interface, a suitable distance may be maintained between adjacent signal paths, thereby reducing the noise susceptibility to an acceptable level. The aligned pin layout may further reduce a length of the signal paths through the interposer device, which may reduce an impedance between the complementary pairs of pins, allowing for operation of the system to occur at lower voltage levels and/or higher clock frequencies.

It is further noted that the examples of FIGS. 5A and 5B are merely for demonstrating the disclosed techniques. Other techniques for coupling two or more IC die are contemplated. For example, in some embodiments, pins for each of two or more IC die may be coupled directly to a circuit board with connections between the die routed through the circuit board.

The circuits and techniques described above in regards to FIGS. 1-5 may couple two external interfaces using a variety of methods. Two methods associated with coupling interfaces are described below in regards to FIGS. 6 and 7.

Figure 6:
FIG. 6 illustrates a flow diagram of an embodiment of a method for transferring data between two coupled integrated circuits.

Moving now to FIG. 6, a flow diagram for an embodiment of a method for coupling two integrated circuits together is shown. Method 600 may be performed by a system that includes two or more instances of an integrated circuit, such as system 100 in FIG. 1. Referring collectively to FIGS. 1 and 6, method 600 begins in block 610.

At block 610, method 600 includes sending, by integrated circuit 101a to integrated circuit 101b, first data via a set of transmit pins of external interface 110a. As shown, integrated circuits 101a and 101b are two instances of a common integrated circuit design. As such, a physical pin layout of the two instances is the same. In other embodiments, however, it is contemplated that respective instances of two different integrated circuits may be used. In FIG. 1, transmit pins of external interface 110a of integrated circuit 101a are coupled to respective receive pins of external interface 110b of integrated circuit 101b, including transmit pin 120a coupled to receive pin 125b. Integrated circuit 101a may therefore, use external interface 110a to send the first data to integrated circuit 101b.

Method 600, at block 620, further includes receiving, by integrated circuit 101a from integrated circuit 101b, second data via a set of receive pins of external interface 110a. As illustrated, receive pins of external interface 110a are coupled to respective receive pins of external interface 110b, including receive pin 125a coupled to transmit pin 120b. The set of transmit pins and the set of receive pins are located in complementary positions relative to axis of symmetry 140 of integrated circuit 101. Accordingly, transmit pins 120a and 120b correspond to a same transmit pin in the common integrated circuit design. Likewise, receive pins 125a and 125b correspond to a same receive pin in the common integrated circuit design. This complementary pin layout of the external interface, relative to axis of symmetry 140, allows the two instances of the common integrated circuit design to be coupled by their respective external interfaces without a need to reroute any pins of the external interface. Instead, direct connections between external interfaces 110a and 110b may be possible without crossing any associated wires. Such a technique for coupling the two instances of the common integrated circuit may allow for an external interface with a large number of pins (e.g., greater than one thousand pins).

In some embodiments, method 600 may end in block 620, or in other embodiments, may repeat in response to new data to be exchanged between the two integrated circuits 101a and 101b. It is noted that the method of FIG. 6 is merely an example for coupling two integrated circuits.

Turning now to FIG. 7, a flow diagram for an embodiment of a method for routing signals between pins of an external interface and one or more on-chip routers is illustrated. In a similar manner as for method 600 above, method 700 may be performed by a system with two or more integrated circuits, such as system 300 in FIG. 3. Referring collectively to FIGS. 3 and 7, method 700 begins in block 710.

Method 700, at block 710, includes routing, by integrated circuit 101a, set of transmit pins 320b to on-chip router 340b using a non-default pin assignment to send first data via set of transmit pins 320a. As shown in FIG. 3, integrated circuit 101a includes interface wrapper 350a that is configured to route signals from on-chip routers 340a and 340b to respective sets of transmit and receive pins in external interface 110a. Interface wrapper 350a may use a default pin assignment for routing set of transmit pins 320b to output signals from on-chip router 340b. Under some conditions, however, interface wrapper 350a may be configured to reroute the output signals from on-chip router 340b to set of transmit pins 320b using a non-default pin assignment. For example, as shown in FIG. 3, on-chip router 340b has fewer output signals than a number of transmit pins included in set of transmit pins 320b. The non-default pin assignment may be used to adjust where individual bits of the first data are received by integrated circuit 101b.

At block 720, method 700 includes routing, by integrated circuit 101a, set of receive pins 325a to on-chip router 340a using a default pin assignment to receive second data via set of receive pins 325a. As illustrated, interface wrapper 350a may be further configured, in some cases, to use the default pin assignment to couple set of receive pins 325a to on-chip router 340a, for example, when interface wrapper 350b in integrated circuit 101b uses a non-default pin assignment to reroute a pin assignment before the second data is sent from set of transmit pins 320d in external interface 110b such that the individual bits of the second data arrive in a desired order.

Such use of default and non-default pin assignments may increase a flexibility of the external interfaces of two integrated circuits that are coupled together. By allowing signals to be rerouted between the external interfaces and the on-chip routers, consistency of signals passing between the two external interfaces may be increased as compared to rerouting signals via wires between the two external interfaces. In addition, programmable routing capabilities of the interface wrappers may increase a flexibility of the external interfaces, potentially allowing the external interfaces to be utilized for an increased number of data types to be transferred between the integrated circuits without a need to pre-process data before sending or post-process received data in order to place transferred data bits in a proper bit position.

It is noted that the method of FIG. 7 is merely an example for routing data between an on-chip router and an external interface. Method 700 may be performed by any instances of the integrated circuits disclosed in FIGS. 1-5. Variations of the disclosed methods are contemplated, including combinations of operations of methods 600 and 700. For example, block 710 of method 700 may be performed prior to performance of block 610 in method 600, and block 720 may be performed prior to performance of block 620 of method 600.

Figure 8:
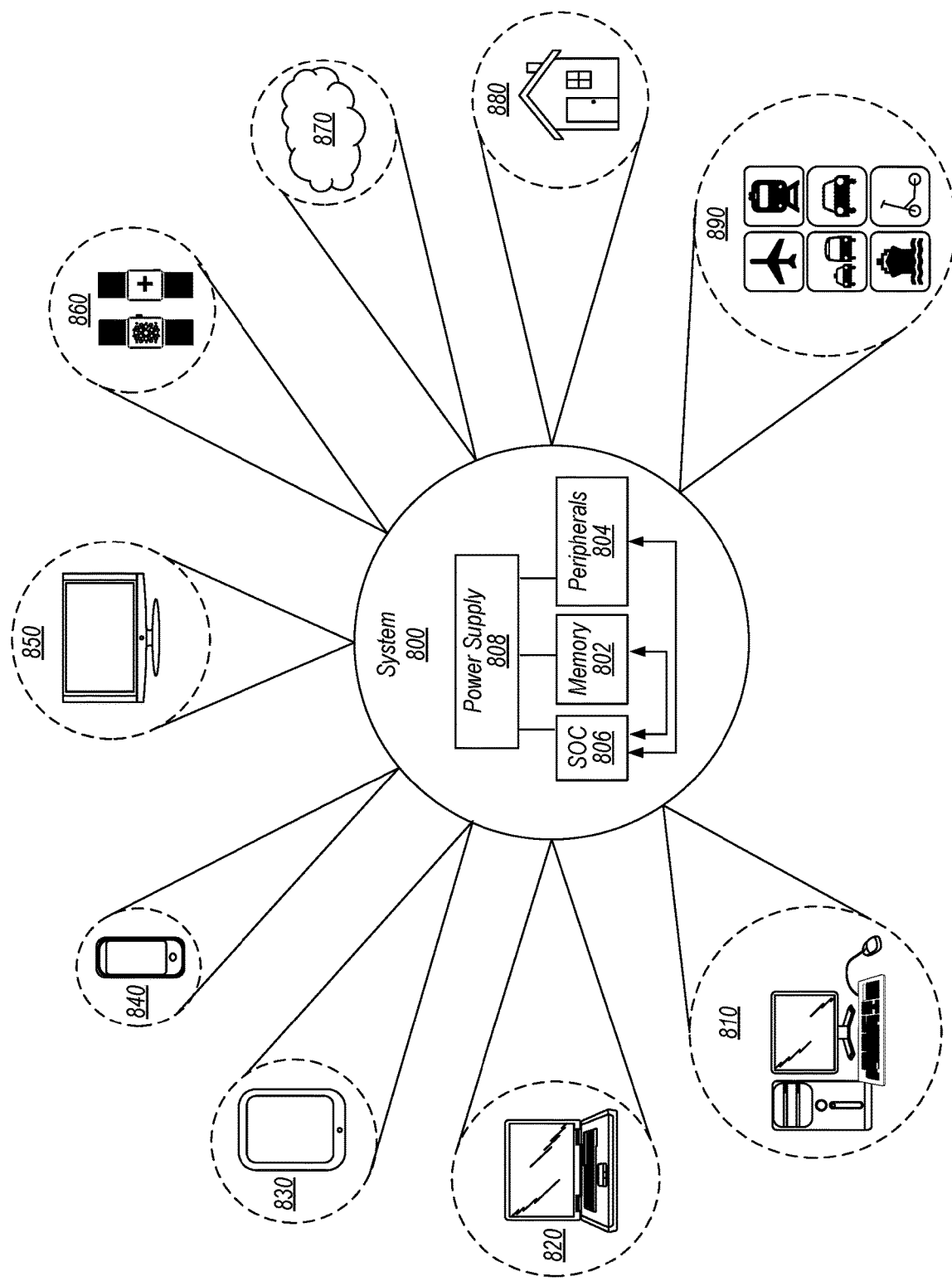
FIG. 8 depicts various embodiments of systems that include coupled integrated circuits.

FIGS. 1-7 illustrate apparatus and methods for a system that includes coupling of two or more integrated circuits using an external interface with a complementary pin layout. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 800 is illustrated in FIG. 8. Computer system 800 may, in some embodiments, include any disclosed embodiment of systems 100, 300, 500, and 505.

In the illustrated embodiment, the system 800 includes at least one instance of a system on chip (SoC) 806 which may include multiple types of processing circuits, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices 870 are contemplated as well, such as devices worn around the neck, devices attached to hats or other headgear, devices that are implantable in the human body, eyeglasses designed to provide an augmented and/or virtual reality experience, and so on.

System 800 may further be used as part of a cloud-based service(s) 880. For example, the previously mentioned devices, and/or other devices, may access computing resources in the cloud (i.e., remotely located hardware and/or software resources). Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise.

It is noted that the wide variety of potential applications for system 800 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 8 are illustrative only and are not intended to be limiting. Other devices are possible and are contemplated.

As disclosed in regards to FIG. 8, computer system 800 may include two or more integrated circuits coupled together and included within a personal computer, smart phone, tablet computer, or other type of computing device. A process for designing and producing an integrated circuit using design information is presented below in FIG. 9.

Figure 9:
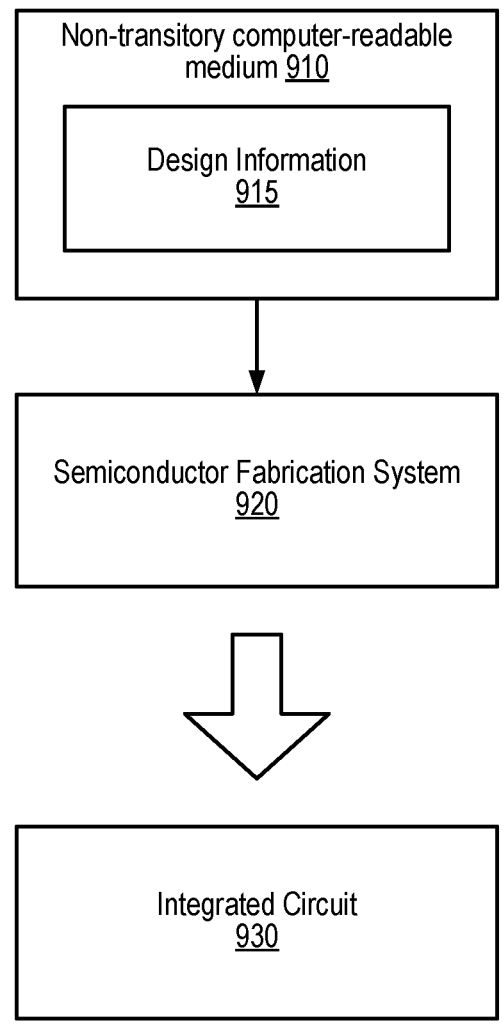
FIG. 9 shows a block diagram of an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, integrated circuits 101*a* and 101*b* as shown in multiple figures. In the illustrated embodiment, semiconductor fabrication system 920 is configured to process the design information 915 stored on non-transitory computer-readable storage medium 910 and fabricate integrated circuit 930 (e.g., integrated circuit 101) based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits, such as integrated circuits 101*a* and 101*b* in FIGS. 1 and 3.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A system, comprising:
   a first instance of a particular integrated circuit die having a die-to-die interface with a physical pin layout having transmit and receive pins for a particular bus located in complementary positions relative to an axis of symmetry; and
   a second instance of the particular integrated circuit die having the die-to-die interface;
   wherein the die-to-die interfaces of the first and second instances of the particular integrated circuit die are coupled such that conductive paths from the transmit and receive pins for the particular bus on the first instance are aligned, respectively, to receive and transmit pins for the particular bus on the second instance without crossing.

2. The system of claim 1, wherein the particular integrated circuit die includes a plurality of transmitter circuits and a plurality of receiver circuits corresponding to respective ones of a plurality of transmit pins and a plurality of receive pins, and wherein the plurality of transmitter circuits and the plurality of receiver circuits are arranged in a physical layout corresponding to the physical pin layout.

3. The system of claim 1, wherein the particular integrated circuit die includes a plurality of on-chip routers coupled to a bus circuit that supports communication on-chip and between the first and second instances of the particular integrated circuit die, and wherein the plurality of on-chip routers are coupled to respective portions of the die-to-die interface.

4. The system of claim 3, wherein the transmit and receive pins of the die-to-die interface are grouped into sets of pins, wherein the sets of pins have a common number of pins, and wherein individual ones of the plurality of on-chip routers are assigned to a respective one or more of the sets of pins.

5. The system of claim 4, wherein a particular on-chip router of the plurality of on-chip routers includes a particular number of pins, different than the common number, and wherein at least one pin of the respective one or more of the sets of pins assigned to the particular on-chip router are unused.

6. The system of claim 3, wherein a first on-chip router of the plurality of on-chip routers is coupled to the transmit pin for a given I/O signal;
   wherein a second on-chip router of the plurality of on-chip routers is coupled to the receive pin for the given I/O signal; and
   wherein the first on-chip router is coupled to the second on-chip router.

7. The system of claim 6, further comprising an interface wrapper wherein the interface wrapper is configured to:
   route the transmit pin to a default pin assignment in the first on-chip router; and
   route the receive pin to a non-default pin assignment in the second on-chip router.

8. A method, comprising:
   sending, by a first instance of a particular integrated circuit design to a second instance of the particular integrated circuit design, first data via a set of transmit pins of a die-to-die interface; and
   receiving, by the first instance of the particular integrated circuit design from the second instance of the particular integrated circuit design, second data via a set of receive pins of the die-to-die interface, wherein the set of transmit pins and the set of receive pins are located in complementary positions relative to an axis of symmetry of the particular integrated circuit design; and
   wherein the die-to-die interfaces of the first and second instances of the particular integrated circuit design are coupled such that conductive paths attached to transmit and receive pins on the first instance are attached, respectively, to receive and transmit pins on the second instance without crossing.

9. The method of claim 8, wherein sending, by the first instance, the first data via the set of transmit pins of the die-to-die interface comprises transmitting a particular set of signals to the second instance via the die-to-die interface using a particular on-chip router.

10. The method of claim 9, wherein receiving, by the first instance, data via the set of receive pins of the die-to-die interface comprises receiving a different set of signals from the second instance via the die-to-die interface using a different on-chip router.

11. The method of claim 8, wherein the set of transmit pins includes a first number of pins, and wherein sending, by the first instance, data via the set of transmit pins of the die-to-die interface comprises, sending the data in a plurality of data packets, wherein ones of the plurality of data packets include a second number of bits, and wherein the second number is less than the first number.

12. The method of claim 11, further comprising sending, at a different point in time, a different plurality of data packets, wherein ones of the different plurality of data packets include the first number of bits.

13. The method of claim 8, wherein a particular transmit pin of the set of transmit pins and a complementary receive pin of the set of receive pins are located a same distance from the axis of symmetry.

14. The method of claim 8, wherein sending, by the first instance, the first data via the set of transmit pins of the die-to-die interface comprises routing the set of transmit pins to a first on-chip router using a non-default pin assignment; and
   wherein receiving, by the first instance, the second data via the set of receive pins of the die-to-die interface comprises routing the set of receive pins to a second on-chip router using a default pin assignment.

15. An apparatus comprising:
   a bus circuit configured to transfer given data among a plurality of functional circuits in a particular integrated circuit; and
   a die-to-die interface, included in the particular integrated circuit, coupled to the bus circuit and including a plurality of transmitter circuits coupled to a particular set of transmit pins and a plurality of receiver circuits coupled to a particular set of receive pins;
   wherein the particular set of transmit pins is arranged in a particular layout relative to an axis of symmetry of the die-to-die interface;
   wherein the particular set of receive pins is arranged in a complementary layout to the particular layout, relative to the axis of symmetry; and
   wherein the die-to-die interface is configured to transfer particular data between the bus circuit and a different integrated circuit that includes the die-to-die interface in a manner that is transparent to software executing on the apparatus.

16. The apparatus of claim 15, further comprising a plurality of on-chip routers configured to transfer the particular data between the bus circuit and the die-to-die interface via a plurality of signals.

17. The apparatus of claim 16, further comprising an interface wrapper coupled to the plurality of on-chip routers and to the die-to-die interface and configured to:
   route, for a first portion of the particular data, the plurality of signals between the on-chip routers and the die-to-die interface using a first pin assignment; and
   re-route, for a second portion of the particular data, the plurality of signals between the on-chip routers and the die-to-die interface using a second pin assignment different from the first pin assignment.

18. The apparatus of claim 16, wherein the die-to-die interface includes a plurality of sets of transmit and receive pins, and wherein power signals and clock signals are controlled independently for at least some sets of transmit and receive pins in the plurality of sets of transmit and receive pins.

19. The apparatus of claim 18, wherein a particular on-chip router of the plurality of on-chip routers is coupled to two or more sets of the plurality of sets of transmit and receive pins; and
   wherein a number of data bits supported by the particular on-chip router in parallel is less than a total number of transmit and pins included in the two or more sets.

20. The apparatus of claim 16, wherein the bus circuit includes a plurality of buses, wherein the plurality of on-chip routers includes a pair of on-chip routers that are coupled to a common bus of the plurality of buses; and
   wherein a first of the pair of on-chip routers is coupled to a particular set of transmit and receive pins of the die-to-die interface located on one side of the axis of symmetry; and
   wherein a second of the pair of on-chip routers is coupled to a different set of transmit and receive pins of the die-to-die interface located on an opposite side of the axis of symmetry, complementary to the particular set of transmit and receive pins.

\* \* \* \* \*